United States Patent [19]
Deering

[11] Patent Number: 5,392,393
[45] Date of Patent: Feb. 21, 1995

[54] ARCHITECTURE FOR A HIGH PERFORMANCE THREE DIMENSIONAL GRAPHICS ACCELERATOR

[75] Inventor: Michael F. Deering, Los Altos, Calif.

[73] Assignee: Sun Microsystems, Inc., Mountain View, Calif.

[21] Appl. No.: 71,699

[22] Filed: Jun. 4, 1993

[51] Int. Cl.⁶ .............................................. G06F 15/20
[52] U.S. Cl. .................................... 395/162; 395/119; 395/163
[58] Field of Search ................... 395/162–164, 395/138–139, 140–143, 119, 120, 126–127, 133, 250, 275, 425; 364/228, 231.8, 931.4, 931.41, 931.49, 948.34

[56] References Cited

U.S. PATENT DOCUMENTS

| | | | |
|---|---|---|---|
| 5,159,665 | 10/1992 | Priem et al. | 395/134 |
| 5,307,449 | 4/1994 | Kelley et al. | 395/119 |
| 5,317,682 | 5/1994 | Luken, Jr. | 395/142 |

Primary Examiner—Mark R. Powell
Assistant Examiner—Kee M. Tung
Attorney, Agent, or Firm—Blakely Sokoloff Taylor & Zafman

[57] ABSTRACT

A graphics accelerator is disclosed that achieves high performance at a relatively low cost by overcoming the variety of system constraints. The graphics accelerator comprises a command preprocessor for translating differing geometry input data formats into a standard format, a set of floating-point processors optimized for three dimensional graphics functions, and a set of draw processors that concurrently perform edgewalking and scan interpolation rendering functions for separate portions of a triangle.

17 Claims, 5 Drawing Sheets

ARCHITECTURE FOR A HIGH PERFORMANCE THREE DIMENSIONAL GRAPHICS ACCELERATOR

BACKGROUND OF THE INVENTION

1. Field of the Invention

This invention relates to the field of computer graphics systems. More particularly, this invention relates to an architecture for a high performance three dimensional graphics accelerator in a computer system.

2. Art Background

A three dimensional graphics accelerator is a specialized graphics rendering subsystem for a computer system. Typically, an application program executing on a host processor of the computer system, generates three dimensional geometry input data that defines three dimensional graphics elements for display on a display device. The application program typically transfers the geometry input data from the host processor to the graphics accelerator. Thereafter, the graphics accelerator renders the corresponding graphics elements on the display device.

The design architecture of a high performance three dimensional graphics system historically embodies a balance between system performance and system cost. The typical design goal is to increase system performance while minimizing increases in system cost. However, prior graphics systems usually suffer from either limited performance or high cost due to a variety of system constraints.

For example, a high performance graphics system typically implements an interleaved frame buffer comprised of multiple VRAM banks because the minimum read-modify-write cycle time for commercially available video random access memory (VRAM) chips is a fundamental constraint on rendering performance. The implementation of multiple interleaved VRAM banks enables parallel pixel rendering into the frame buffer to increase overall rendering performance. Unfortunately, the separate addressing logic required for each interleave VRAM bank increases the cost and power consumption of such high performance systems.

On the other hand, a graphics system may implement a rendering processor on a single integrated circuit chip to minimize cost and power consumption. Unfortunately, such systems suffer from poor rendering performance due to the limited number of interface pins available with the single integrated circuit chip. The limited number of interface pins reduces the interleave factor for the frame buffer, thereby precluding the rendering performance benefits of parallel processing.

Another graphics system constraint is the proliferation of differing three dimensional geometry input data formats that define similar drawing functions. A graphics systems is typically required to support many of the differing geometry input data formats. Some prior graphics systems support the differing geometry formats in graphics processor micro-code. However, such a solution greatly increases the size and complexity of the graphics processor micro-code, thereby increasing system cost and decreasing system performance. Other prior graphics systems support the differing geometry formats by employing a host processor to translate the differing formats into a standard format for the graphics processor. Unfortunately, such format translation by the host processor creates a system bottleneck that may severely limit overall graphics system performance.

In addition, prior graphics systems often perform transformation, clip test, face determination, lighting, clipping, screen space conversion, and setup functions using commercially available digital signal processing (DSP) chips. However, such DSP chips are typically not optimized for three dimensional computer graphics. The internal registers provided in a typical DSP chip are too few in number to accommodate the inner loops of most three dimensional graphics processing algorithms. In such systems, on-chip data caches or SRAMs are typically employed to compensate for the limited number of internal fast registers provided by the DSP chip. However, such on-chip data caches are usually implement scheduling algorithms that are not controllable. Moreover, such on-chip SRAMs are usually not suitable for a multi-processing environment.

Also, DSP chips typically require an assortment of support chips to function in a multi-processing environment. Unfortunately, the addition of the support chips to a graphics system increases printed circuit board area, increases system power consumption, increases heat generation, and increases system cost.

Prior graphics systems often employ a parallel processing pipeline to increase graphics processing performance. For example, the scan conversion function for a shaded triangle in a graphics system is typically performed by a linear pipeline of edgewalking and scan interpolation. Typically in such systems, the edgewalking function is performed by an edgewalking processor, and the scan interpolation function is performed by a set of parallel scan interpolation processors that receive parameters from the edgewalking processor.

However, such systems fail to obtain parallel processing speed benefits when rendering relatively long thin triangles, which are commonly encountered in tessellated geometry. The parameter data flow between the edgewalking processor and the scan interpolation processors greatly increases when performing scan conversion on long thin triangles. Unfortunately, the increased parameter data flow slows triangle rendering and reduces graphics system performance.

As will be described, the present invention is a graphics accelerator that achieves high performance at a relatively low cost by overcoming the variety of system constraints discussed above. The present graphics accelerator comprises a command preprocessor for translating the differing geometry input data formats, a set of floating-point processors optimized for three dimensional graphics functions, and a set of draw processors that concurrently perform edgewalking and scan interpolation rendering functions for separate portions of a geometry object.

SUMMARY OF THE INVENTION

A high performance three dimensional graphics accelerator in a computer system is disclosed. The graphics accelerator has a command preprocessor for translating geometry input data from differing formats. The command preprocessor implements both a 3D geometry pipeline and a direct data pipeline. The 3D geometry pipeline of the command preprocessor accesses an input vertex packet over a host bus using either programmed input/output or direct memory access. The command preprocessor reformats the input vertex packet into a reformatted vertex packet, and then transfers the reformatted vertex packet to an available floating-point processor over a floating-point bus as an output geometry packet with optional data substitutions and data compression.

A set of four floating-point processors are coupled for communication over the floating-point bus. The first available floating-point processor receives the output geometry packet over the floating-point bus, and generates an draw packet containing parameters for a screen space geometry object. The floating-point processor transfers the draw packet to a set of five draw processors over a draw bus. Each floating-point processor implements specialized features and instructions for performing three dimensional graphics functions.

The command preprocessor controls transfer of output geometry packets into the floating-point processors, and the flow of draw packets to the draw processors.

The five draw processors concurrently receive each draw packet over the draw bus. Each draw processor performs edgewalking and scan interpolation functions to render the three dimensional triangle defined by the draw packet. Each draw processor renders every fifth pixel on a scan line, such that the five draw processors taken together render the entire triangle. Each draw processor renders pixels into a separate interleave bank of a five bank interleaved frame buffer. In addition, each draw processor receives and processes direct port data from the direct port pipeline of the command preprocessor.

DETAILED DESCRIPTION OF THE INVENTION

An architecture for a high performance three dimensional graphics accelerator in a computer system is disclosed. In the following description for purposes of explanation specific applications, numbers, apparatus, configurations and circuits are set forth in order to provide a thorough understanding of the present invention. However, it will be apparent to one skilled in the art that the present invention may be practiced without these specific details. In other instances well known systems are shown in diagrammatical or block diagram form in order not to obscure the present invention unnecessarily.

Figure 1:
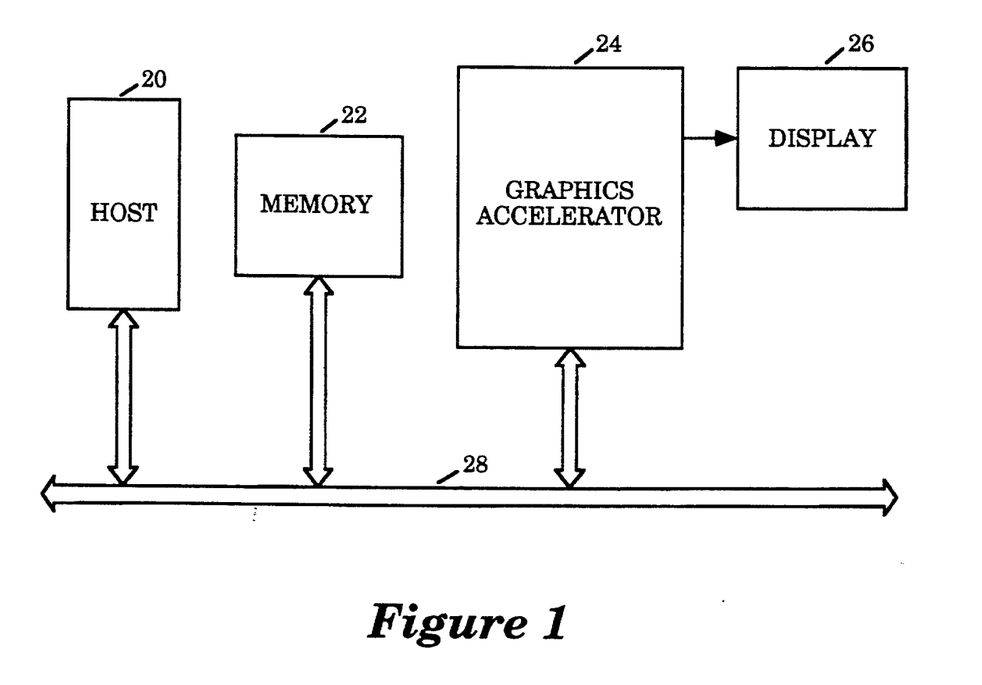
FIG. 1 is a block diagram of a computer system including a host processor, a memory subsystem, a graphics accelerator, and a display device.

Referring now to FIG. 1, a block diagram of a computer system is shown, including a host processor 20, a memory subsystem 22, a graphics accelerator 24, and a display device 26. The host processor 20, the memory subsystem 22, and the graphics accelerator 24 are each coupled for communication over a host bus 28.

The display device 26 represents a wide variety of raster display monitors. The host processor 20 represents a wide variety of computer processors, multiprocessors and CPUs, and the memory subsystem 22 represents a wide variety of memory subsystems including random access memories and mass storage devices. The host bus 28 represents a wide variety of communication or host computer busses for communication between host processors, CPUs, and memory subsystems, as well as specialized subsystems.

The host processor 20 transfers information to and from the graphics accelerator 24 according to a programmed input/output (I/O) protocol over the host bus 28. Also, the graphics accelerator 24 accesses the memory subsystem 22 according to a direct memory access (DMA) protocol.

A graphics application program executing on the host processor 20 generates geometry data arrays containing three dimensional geometry information that define an image for display on the display device 26. The host processor 20 transfers the geometry data arrays to the memory subsystem 22. Thereafter, the graphics accelerator 24 reads in geometry data arrays using DMA access cycles over the host bus 28. Alternatively, the host processor 20 transfers the geometry data arrays to the graphics accelerator 24 with programmed I/O over the host bus 28.

The three dimensional geometry information in the geometry data arrays comprises a stream of input vertex packets containing vertex coordinates (vertices), vertex position, and other information that defines triangles, vectors and points in a three dimensional space which is commonly referred to as model space. Each input vertex packet may contain any combination of three dimensional vertex information, including vertex normal, vertex color, facet normal, facet color, texture map coordinates, pick-id's, headers and other information.

A headerless input vertex packet may define a triangle strip in the form of a "zig zag" pattern of adjacent triangles. A headerless input vertex packet may also define a triangle strip in the form of a "star strip" pattern of triangles. In addition, a headerless input vertex packet may define a strip of isolated triangles. An input vertex packet having a header may change triangle strip formats for each triangle and change between "zig zag" format, "star" format, and isolated triangles.

Figure 2:
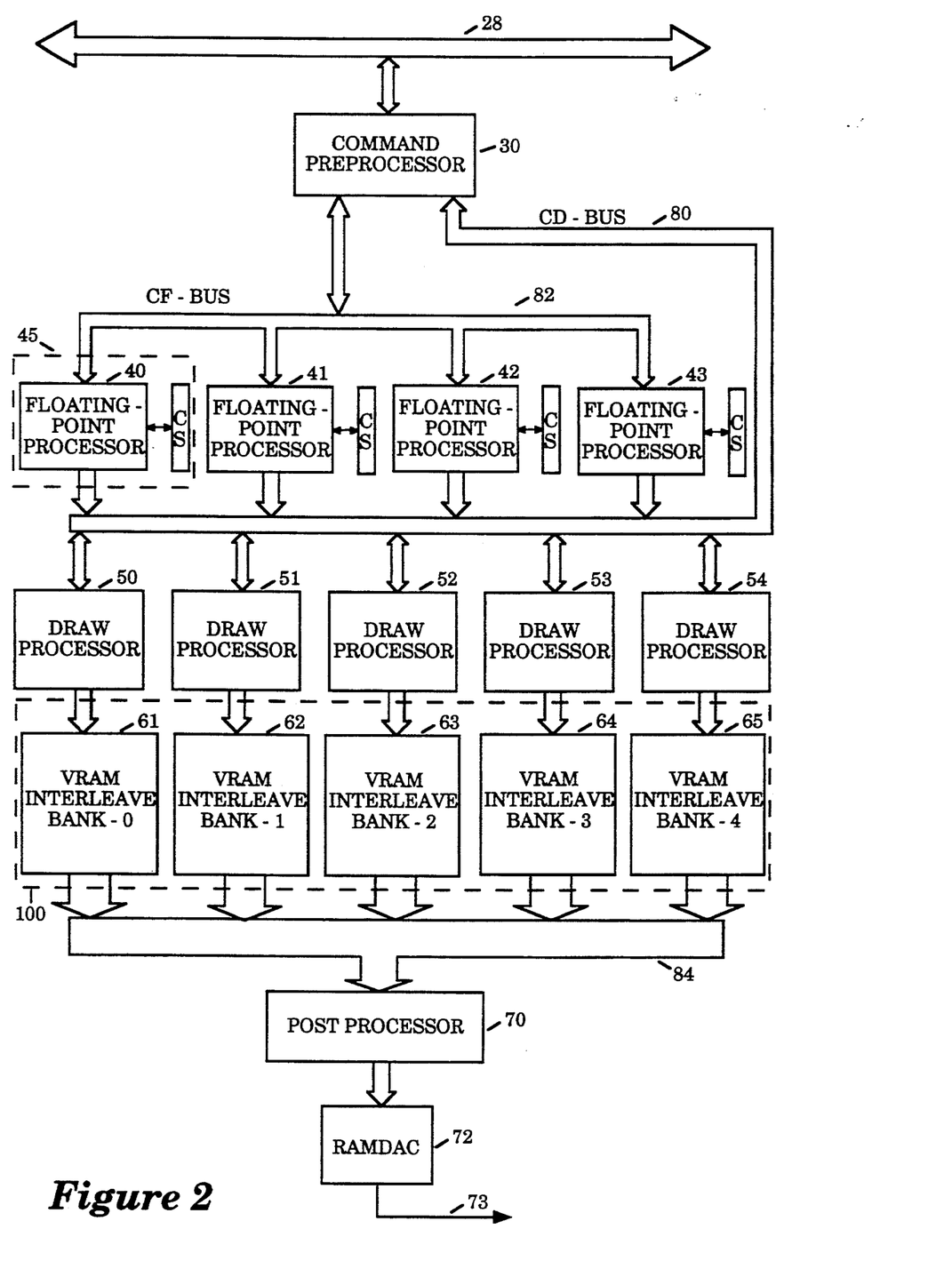
FIG. 2 is a block diagram of the graphics accelerator, which is comprised of a command preprocessor, a set of floating-point processors, a set of draw processors, a frame buffer, a post-processor, and a random access memory/digital-to-analog converter (RAMDAC).

FIG. 2 is a block diagram of the graphics accelerator 24. The graphics accelerator 24 is comprised of a command preprocessor 30, a set of floating-point processors 40–43, a set of draw processors 50–54, a frame buffer 100, a post-processor 70 and a random access memory/digital-to-analog converter (RAMDAC) 72. The RAMDAC 72 is similar to commercially available RAMDACs that implement look-up table functions.

For one embodiment, the command preprocessor 30, the floating-point processors 40–43, the draw processors 50–54, and the post-processor 70 are each individual integrated circuit chips.

The command preprocessor 30 is coupled for communication over the host bus 28. The command preprocessor 30 performs DMA reads of the geometry data arrays from the memory subsystem 22 over the host bus 28. The host processor 20 transfers virtual memory pointers to the command preprocessor 30. The virtual memory pointers point to the geometry data arrays in the memory subsystem 22. The command preprocessor 30 converts the virtual memory pointers to physical memory addresses for performing the DMA reads to the memory subsystem 22 without intervention flora the host processor 20.

The command preprocessor 30 implements two data pipelines; a 3D geometry pipeline, and a direct port pipeline.

In the direct port pipeline, the command preprocessor 30 receives direct port data over the host bus 28, and transfers the direct port data over a command-to-draw bus (CD-BUS) 80 to the draw processors 50-54. The direct port data is optionally processed by the command preprocessor 30 to perform X11 functions such as character writes, screen scrolls and block moves in concert with the draw processors 50-54. The direct port data may also include register writes to the draw processors 50-54, and individual pixel writes to the frame buffer 100.

In the 3D geometry pipeline, the command preprocessor 30 accesses a stream of input vertex packets from the geometry data arrays, reorders the information contained within the input vertex packets, and optionally deletes information in the input vertex packets. The command preprocessor 30 reorders the information from the input vertex packet into reformatted vertex packets having a standardized element order. The command preprocessor 30 then transfers output geometry packets over a command-to-floating-point bus (CF-BUS) 82 to one of the floating-point processors 40-43. The output geometry packets comprise the reformatted vertex packets with optional modifications and data substitutions.

The command preprocessor 30 converts the information in each input vertex packet from differing number formats into the 32 bit IEEE floating-point number format. The command preprocessor 30 converts 8 bit fixed-point numbers, 16 bit fixed-point numbers, and 32 bit or 64 bit IEEE floating-point numbers.

The command preprocessor 30 either reformats or inserts header fields, inserts constants, and generates and inserts sequential pick-id's, and optionally inserts constant sequential pick-id's. The command preprocessor 30 examines the chaining bits of the header and reassembles the information from the input vertex packets into the reformatted vertex packets containing completely isolated geometry primitives including points, lines and triangles.

The command preprocessor 30 receives control and status signals from the floating-point processors 40-43 over a control portion of the CF_BUS 82. The control and status signals indicate the availability of input buffers within the floating-point processors 40-43 for receiving the output geometry packets.

The floating-point processors 40-43 are each substantially similar. Each floating-point processor 40-43 implements a 32 bit micro-code driven floating-point core, along with parallel input and output packet communication hardware. Each of the floating-point processors 40-43 implements floating-point functions including multiply, ALU, reciprocal, reciprocal-square-root and integer operations. Each floating-point processor 40-43 implements a wide assortment of specialized graphics instructions and features. Each floating-point processor 40-43 is optimized to implement the number of fast internal registers required to perform the largest common three dimensional graphics processing micro-code inner loop implemented by the graphics accelerator 24.

For one embodiment, each floating-point processor 40-43 is implemented on a single integrated circuit chip. The only support chips required for each floating-point processor 40-43 is a set of four external SRAM chips that provide an external micro-code in a control store (CS).

Each floating-point processor 40-43 implements a function for setting up triangles for scan conversion by the draw processors 50-54. The first step of the setup function sorts the three vertices of a triangle in ascending y order. Each floating-point processors 40-43 broadcasts draw packets to all of the draw processors 50-54 over the CD-BUS 80. The draw packets comprises final geometry primitives, including triangles, points arid lines.

The draw processors 50-54 function as VRAM control chips for the frame buffer 100. The draw processors 50-54 concurrently render an image into the frame buffer 100 according to an draw packet received from one of the floating-point processors 40-43 or according to a direct port packet received from the command preprocessor 30.

Each draw processor 50-54 performs the scan conversion functions of edgewalking function and scan interpolation. The replication of the edgewalking and scan interpolation functions among the draw processors 50-54 obviates the need for large scale communication pathways between separate edgewalking and scan interpolation processors, thereby minimizing the pin counts of each of the draw processors 50-54 and decreasing printed circuit board space requirements.

The frame buffer 100 is arranged as a set of 5 VRAM interleave banks. The draw processor 50 writes pixel data into an interleave bank_0 61, the draw processor 51 writes pixel data into an interleave bank_1 62, the draw processor 52 writes pixel data into an interleave bank_2 63, the draw processor 53 writes pixel data into an interleave bank_3 64, the draw processor 54 writes pixel data into an interleave bank_4 65.

Each draw processor 50-54 renders only the pixels visible within the corresponding interleave bank 61-65. The draw processors 50-54 concurrently render the triangle primitive defined by an draw packet to produce the correct combined rasterized image in the frame buffer 100 Each draw processor 50-54 rasterizes every fifth pixel along each scan line of the final rasterized image. Each draw processor 50-54 starts a scan line biased by 0, 1, 2, 3, or 4 pixel spaces to the right.

Each draw processor 50-54 optionally performs depth cueing. Each pixel of a triangle, vector or dot rendered may be depth cued within the draw processors 50-54 without the performance penalty of prior graphics systems that perform depth cueing in floating-point processors. Each draw processor 50-54 optionally performs rectangular window clipping, blending and other pixel processing functions.

The post-processor 70 receives interleaved pixel data from the frame buffer 100 over the video bus 84. The post-processor 70 performs color look-up table and cursor functions. The RAMDAC 72 converts the pixel data received from the post-processor 70 into video signals 73 for the display device 26.

Figure 3:
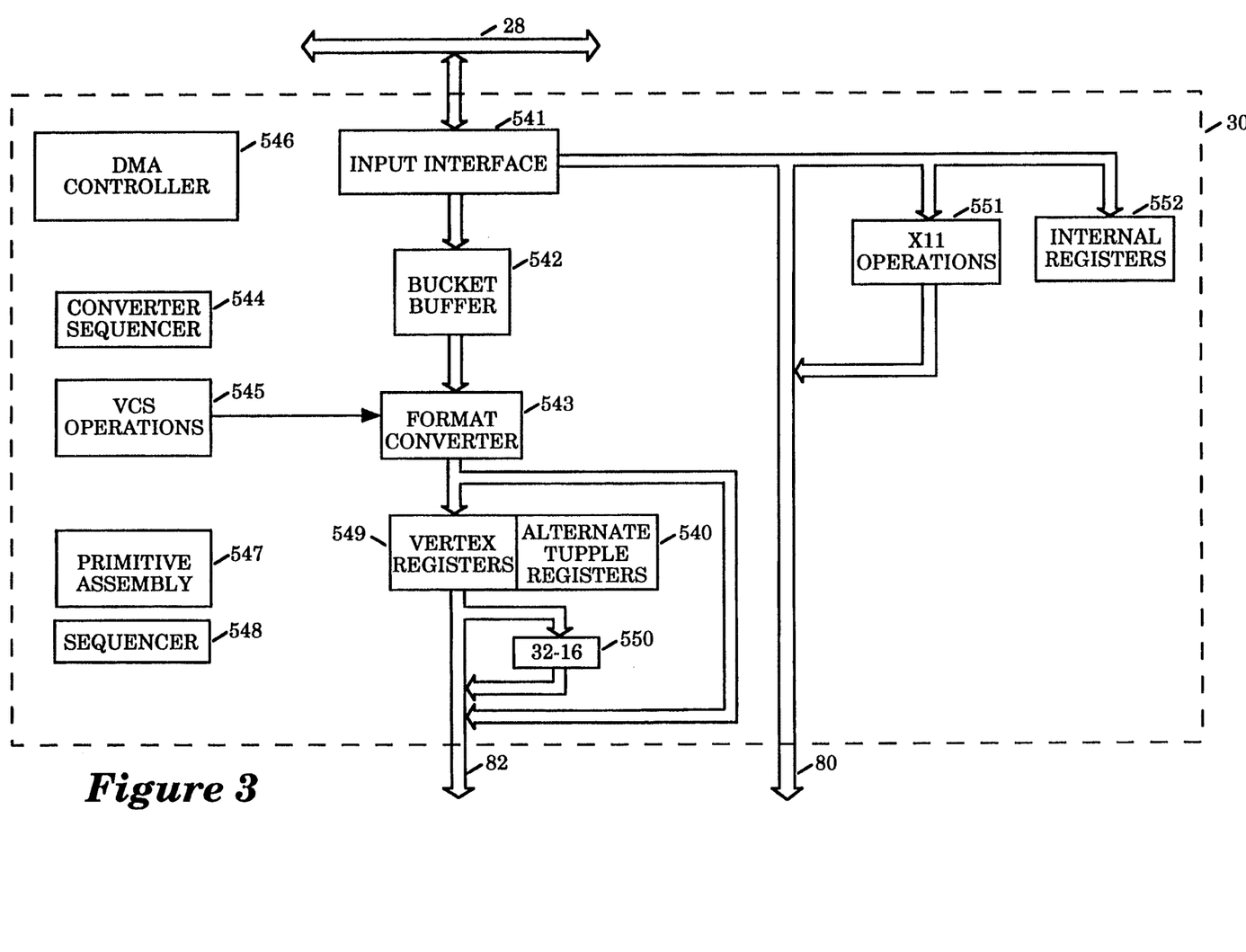
FIG. 3 is a block diagram of the command preprocessor which shows the reformatting circuitry of the 3D geometry pipeline, along with the direct port data pipeline.

FIG. 3 is a block diagram of the command preprocessor 30. The command preprocessor 30 is shown coupled to the host bus 28 for communication through the 3D geometry pipeline and the direct port pipeline. For one embodiment, the command preprocessor 30 is implemented on a single integrated circuit chip.

The direct port pipeline comprises an input interface 541 and an X11 operations circuit 551. The input interface 541 receives direct port data over the host bus 28, and transfers the direct port data over the CD-BUS 80 to the draw processors 50-54. The direct port data includes register writes to the draw processors 50-54 and individual pixel writes to the frame buffer 100. The direct port data is optionally transferred to the X11 operations circuit 551 to perform X11 functions such as character writes, screen scrolls, and block moves in concert with the draw processors 50-54.

The 3D geometry pipeline comprises the input interface 541, a bucket buffer 542, a format converter 543, a vertex buffer comprising a set of vertex registers 549 and alternate tupple registers 540. Format conversion in the 3D geometry pipeline is controlled by a VCS operations circuit 545 and a converter sequencer 544. Output geometry packets are assembled by a primitive assembly circuit 547 and a sequencer 548. A 32-16 circuit 550 optionally performs data compression. A set of internal registers 552 are programmed over the host bus 28 to control the operations of the 3D geometry pipeline and the direct port pipeline. A DMA controller 546 performs DMA transfers into the bucket buffer 542 over the host bus 28.

The input interface 541 contains a burst buffer for interfacing between the differing clocking environments of the host bus 28 and the command preprocessor 30. The burst buffer functions as a set of temporary holding registers for input vertex packets transferred into the bucket buffer 542.

The format converter circuit 543 accesses the input vertex packets from the bucket buffer 542, and assembles the reformatted vertex packets into the vertex registers 549. The format converter circuit 543 is controlled by the VCS operations circuit 545 according to preprogrammed format conversion operations. The format conversion is sequenced by the converter sequencer 544.

The primitive assembly circuit 547 under control of the sequencer 548 accesses the reformatted vertex packets from the vertex registers 549, and transfers the output geometry packets over the CF-BUS 82. The primitive assembly circuit 547 optionally substitutes alternate tupples from the alternate tupple registers 540. The primitive assembly circuit 547 also optionally performs data compression on data in the output geometry packets using the 32-16 circuit 550.

The format converter 543 processes input vertex packets that define a triangle strip. Header bits in each input vertex packet specify a replacement type. The replacement type defines the combination of a subsequent input vertex packet with previous input vertex packets to form a next triangle in the triangle strip. The format converter 543 implements a register stack that holds the last three vertices in the triangle strip. The format converter 543 labels the last three vertices in the triangle strip as the oldest, the middlest, and the newest.

A triangle strip with a "zig-zag" pattern corresponds to a new input vertex packet having a header that specifies the replacement type replace_oldest. The replacement type replace_oldest causes the format converter 543 to replace the oldest vertex by the middlest, and to replace the middlest vertex by the newest, and to set the newest vertex to the vertex in the new input vertex packet. The foregoing pattern corresponds to a PHIGS_PLUS simple triangle strip.

A triangle strip with a "star" pattern corresponds to a new input vertex packet having a header that specifies the replacement type replace_middlest. The replacement type replace_middlest causes the format converter 543 to leave the oldest vertex unchanged, to replace the middlest vertex by the newest vertex, and to set the newest vertex to the vertex in the new input vertex packet.

To begin a generalized triangle strip, a new input vertex packet has a header that specifies the replacement type restart. The replacement type restart causes the format converter 543 to mark the oldest and the middlest vertices as invalid, and to set the newest vertex to the vertex in the new input vertex packet.

The primitive assembly circuit 547 transfers an output geometry packet for a triangle from the vertex registers 549 and alternate tupple registers 540 over the CF-BUS 82 whenever a replacement operation generates three valid vertices in the vertex registers 549.

The restart replacement type in the header of a input vertex packet corresponds to a move operation for polylines. The restart replacement type enables a single data structure, the geometry data array in the memory subsystem 22, to specify multiple unconnected variable length triangle strips. Such a capability reduces the overhead required for starting a DMA sequence over the host bus 28.

The replacement types in the input vertex packets received by the command preprocessor 30 from the geometry data array in the memory subsystem enables a triangle strip to change from a "zig zag" pattern to a "star" pattern in the middle of the strip. Such a capability enables the representation of complex geometry in a compact data structure while requiring minimal input data bandwidth over the host bus 28.

The format converter 543 rearranges the vertex order in the vertex registers 549 after every replace_oldest replacement type to normalize the facing of the output triangles in the reformatted vertex packets. The primitive assembly circuit 547 rearranges the vertex order as the vertex is transferred out of the vertex registers 549 such that the front face of the output triangle is always defined by a clockwise vertex order.

A header bit in a input vertex packet specifies an initial face ordering of each triangle strip. In addition, the command preprocessor 30 contains a register with a state bit which causes reversal of the initial face ordering specified in the header. An application program executing on the host processor 20 maintains the state bit to reflect a model matrix maintained by the application program. Also, the command preprocessor 30 reverses the face ordering for every triangle in a "zig-zag" pattern.

The primitive assembly circuit 547 transfers each reformatted vertex packet from the vertex registers 549 to a next available floating-point processor 40-43. The next available floating-point processor 40-43 is determined by sensing input buffer status of each floating-point processor 40-43 over a control portion of the CF-BUS 82.

The command preprocessor 30 maintains a record or "scoreboard" of the ordering of transfer of each reformatted vertex packet to the floating-point processors 40-43. The command preprocessor 30 controls the output buffers of the floating-point processors 40-43 by transferring control signals over a control portion of the CD-BUS 80. The command preprocessor 30 ensures that the reformatted vertex packets are processed through the floating-point processors 40–43 in the proper order when a sequential rendering order is required. If sequential rendering is not required, then the first draw packet at the output of the floating-point processors 40–43 is rendered first.

The format converter 543 also reformats polylines and poly-polylines. In addition, the format converter 543 optionally converts triangle strip data into polyline edges. Such a capability reduces the complexity of the micro-code for the floating-point processors 40–43 because triangle processing is not mixed with line processing during operations that require triangle edge highlighting.

To process edge highlighting of triangles within a triangle strip, the command preprocessor 30 assembles the input vertex packets for the triangle strip into reformatted vertex packets, and passes the reformatted vertex packets to the floating-point processors 40–43 over the CF-BUS 82 as output geometry packets. Thereafter, the command preprocessor 30 accesses the original triangle strip input vertex packets over the host bus 28, and assembles the input vertex packets into reformatted vertex packets containing isolated vectors representing highlighted edges. The command preprocessor 30 then processes the isolated vectors through the floating-point processors 40–43 and the draw processors 50–54 to perform the highlighting function.

For one embodiment the data portion of the CF-BUS 82 is 16 bits wide, and the data portion of the CD-BUS 80 is 16 bits wide. The command preprocessor 30 optionally compresses color and normal data components of the reformatted vertex packets using the 32-16 circuit 550 before transfer to the floating-point processors 40–43 over the CF-BUS 82. The 32-16 circuit 550 compresses the color and normal data from 32 bit IEEE floating-point format into 16 fixed-point format. Thereafter, the floating-point processors 40–43 receive the reformatted vertex packets with the compressed color and normal data components, and decompress the color and normal components back into 32 bit IEEE floating-point values.

The compression of color and normal data components of the reformatted vertex packets does not substantially affect the ultimate image quality for the graphics accelerator 24 because the color components of the reformatted vertex packets are represented as eight bit values in the frame buffer 100. Similarly, normal components of the reformatted vertex packets having a 16 bit unsigned accuracy represent a resolution of approximately plus or minus one inch at one mile. On the other hand, the data compression of color and normal components of the reformatted vertex packets reduces the data transfer bandwidth over the CF-BUS 82 by approximately 25 percent.

Figure 4:
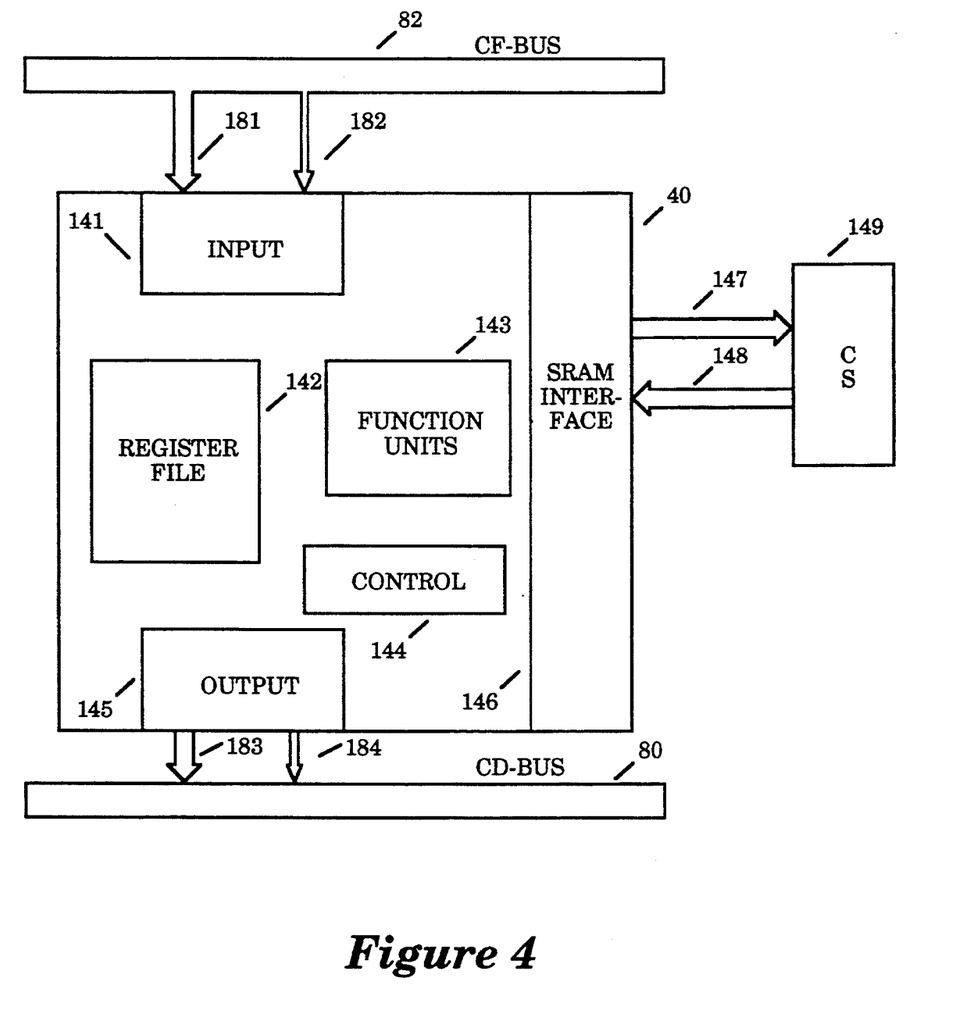
FIG. 4 is a block diagram of a floating-point processor section, including a control store (CS), an input circuit, an output circuit, a register file, a set of functional units, a control circuit, and an SRAM interface circuit.

FIG. 4 is a block diagram of the floating-point processor section 45, which includes the floating-point processor 40 and a control store (CS) 149. The floating-point processor 40 is comprised of an input circuit 141, an output circuit 145, a register file 142, a set of functional units 143, a control circuit 144, and a SRAM interface circuit 146. The floating-point processor 40 implements an internal subroutine stack and block load/store instructions for transfers to the CS 149, as well as integer functions.

The floating-point processor 40 receives the output geometry packets over a data portion 181 of the CF-BUS 82. The command preprocessor 30 transfers control signals over a control portion 182 of the CF-BUS 82 to enable and disable the input buffer 141.

The function units 143 implement a floating-point multiplier, a floating-point ALU, a floating-point reciprocal operation, a reciprocal square-root operation, and an integer ALU. The output circuit 145 transfers draw packets over a data portion 183 of the CD-BUS 80. The output circuit 145 also transfers control signals over a control portion 184 of the CD-BUS 80 to synchronize data transfer to the draw processors 50–54 and to coordinate bus activity on the CD-BUS 80 with the command preprocessor 30.

For one embodiment, the input circuit 141 and the output circuit 145 each contain 64 registers for buffering geometry data. The register file 142 is comprised of one hundred and sixty 32 bit registers.

The SRAM interface 146 communicates with a control store (CS) 149 over a control store address bus 147 in a control store data bus 148. For one embodiment the control store address bus 147 is 17 bits wide and the control store data bus 148 is 32 bits wide. The control store 149 is comprised of four 128k by eight bit SRAMs.

The registers contained in the input circuit 141 are arranged as a pair of 32 register files in a double buffered fashion. Similarly, the registers contained in the output circuit 145 are arranged as a pair of 32 register double buffered register files. The micro-code executing on the floating-point processor 40 accesses the registers of the input circuit 141 and the output circuit 145 as special register files. The instruction set for the floating-point processors 40 includes commands for requesting and for relinquishing the register files, as well as commands for queuing for transmission completed data packets over the CD-BUS 80.

The floating-point processors 40 implements the triangle setup function for scan conversion by the draw processors 50–54. The first stage of the triangle setup function sorts the three vertices of a triangle in ascending y order. The floating-point processor 40 implements a special instruction that reorders a section of a register file 142 in hardware based upon the results of the last three comparisons of the y coordinates of the vertices.

A clip testing function implemented in the floating-point processors 40 computes a vector of clip condition bits. The floating-point processor 40–43 implements a special clip test instruction that computes pairs of the clip condition bits, while shifting the clip condition bits into a special clip register. After the clip condition bits have been computed, special branch instructions decode the clip condition bits contained in the clip register into the appropriate clip condition. The floating-point processor 40 implements separate branch instructions for clipping triangles and vectors. The special branch instructions enable testing of multiple clip conditions within the same instruction.

Figure 5:
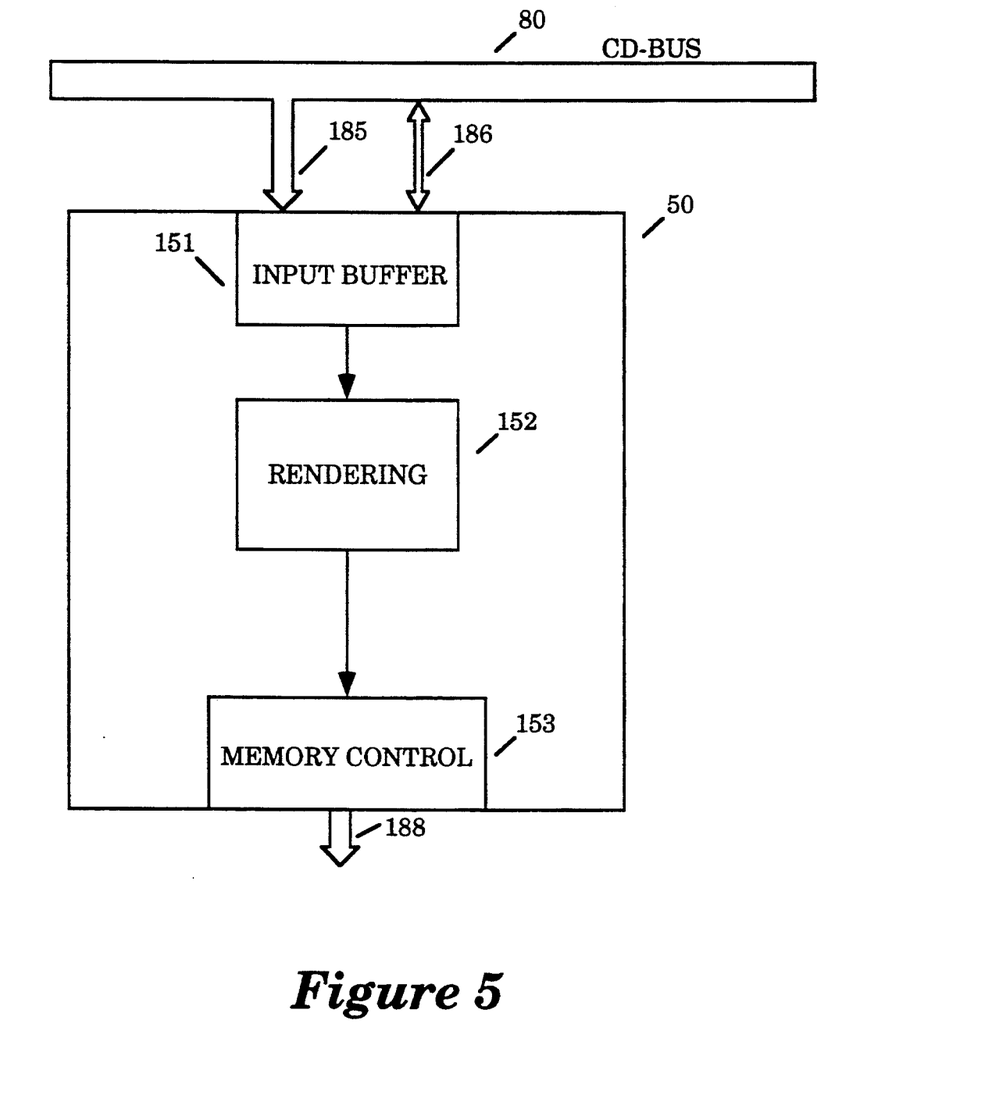
FIG. 5 is a block diagram of the draw processor, which is comprised of an input buffer, a rendering circuit, and a memory control circuit.

FIG. 5 is a block diagram of the draw processor 50. The draw processor 50 is comprised of an input buffer 151, a rendering circuit 152, and a memory control circuit 153. The input buffer 151 provides a double buffered arrangement for receiving geometry data over a data portion 185 of the CD-BUS 80. The input buffer 151 also transfers control signals over a control portion 186 of the CD-BUS 80 to coordinate data transfer with the command preprocessor 30 and the floating-point processors 40–43. The input buffer 151 is arranged such that new geometry data is loaded into the input buffer 151 while old geometry data is being rendered by the rendering circuit 152.

The rendering circuit 152 performs the edgewalking function in one single pixel cycle time in order to prevent slowing of the scan conversion function. The high speed of the edgewalking function is provided because the edgewalking circuit must advance to a next scan line up to five times more often than would be required of a single external edgewalking chip.

The rendering circuit 152 performs rasterization algorithms for both triangles, anti-aliased vectors, aliased vectors, anti-aliased dots, and aliased data. The memory control circuit 153 generates the address and control signals required to transfer pixel data to interleave bank_0 61 over a memory bus 188.

Each draw processor 50-54 implements a high accuracy DDA algorithm that enables sub-pixel accuracy using thirty two bit internal processing units. Aliased and anti-aliased lines and dots are rendered in the distributed manner previously described, wherein each draw processor 50-54 processes every fifth pixel along a scan line.

Each draw processor 50-54 also implements the rendering portions of the X11 operations in coordination with the X11 operations circuit of the command preprocessor 30. The X11 operations include reading and writing of groups of pixels for vertical scrolls, raster operations and stencil operations.

In the foregoing specification the invention has been described with reference to specific exemplary embodiments thereof it will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A graphics accelerator, comprising:
   command preprocessor having a 3D geometry pipeline and a direct port pipeline, the command preprocessor accessing input vertex packets and direct port data over the host bus, the 3D geometry pipeline reformatting the input vertex packets into reformatted vertex packets according to predefined vertex format, the 3D geometry pipeline assembling the reformatted vertex packets into an output geometry packet and transferring the output geometry packet over a floating-point bus, the direct port pipeline transferring the direct port data over a draw bus;
   at least one floating-point processor coupled to communicate over the floating-point bus, the floating-point processor receiving the output geometry packet over the floating-point bus, generating a draw packet, and transferring the draw packet over the draw bus, the draw packet containing parameters that define a geometry object;
   a plurality of draw processors concurrently receiving the draw packet over the draw bus, each draw processor performing edgewalking and scan interpolation functions corresponding to the geometry object, such that each draw processor renders a subset of pixels corresponding to the geometry object;
   frame buffer comprising a plurality of interleave banks, each interleave bank receiving the subset of pixels from one of the draw processors.

2. The graphics accelerator of claim 1, wherein the command preprocessor accesses the input vertex packets over the host bus according to a direct memory access protocol over the host bus.

3. The graphics accelerator of claim 2, wherein the command preprocessor receives virtual memory pointers over the host bus, the virtual memory pointers pointing to a geometry data array in a memory subsystem, the geometry data array containing the input vertex packets, the command preprocessor translating the virtual memory pointers into physical memory pointers for reading the geometry data array over the host bus.

4. The graphics accelerator of claim 1, wherein the command preprocessor accesses the input vertex packets according to a programmed input/output communication protocol over the host bus.

5. The graphics accelerator of claim 1, wherein the floating-point processor comprises a multiple entry input buffer that receives the output geometry packet over the floating-point bus, the floating-point processor transferring a buffer status signal to the command preprocessor over the floating-point bus indicating whether an entry of the input buffer is available.

6. The graphics accelerator of claim 1, wherein the floating-point processor comprises an output buffer that holds the draw packet, the floating-point processor receiving a control signal from the command preprocessor over the draw bus, the control signal causing the output buffer to transfer the draw packet over the draw bus.

7. The graphics accelerator of claim 1, wherein the draw processors comprise a set of five draw processors, such that each draw processor renders every fifth pixel per scan line corresponding to the geometry object.

8. The graphics accelerator of claim 7, wherein the frame buffer comprises a set of five interleaved video random access memory (VRAM) banks.

9. The graphics accelerator of claim 8, wherein each draw processor comprises a memory circuit for accessing a separate interleave VRAM bank of the frame buffer.

10. A method for rendering geometry objects, comprising the steps of:
    accessing input vertex packets over a host bus, and reformatting the input vertex packets into reformatted vertex packets according to predefined vertex format;
    assembling the reformatted vertex packets into an output geometry packet and transferring the output geometry packet over a floating-point bus;
    receiving the reformatted vertex packet over the floating-point bus, and generating a draw packet, such that the draw packet contains parameters that define a geometry object;
    transferring the draw packet over a draw bus;
    receiving the draw packet over the draw bus, and performing edgewalking and scan interpolation functions corresponding to the geometry object, such that a subset of pixels corresponding to the geometry object are rendered;
    transferring the subset of pixels to an interleave bank of an interleaved frame buffer.

11. The method of claim 10, wherein the step of accessing input vertex packets over a host bus comprises the step of accessing the input vertex packets over the host bus according to a direct memory access protocol over the host bus.

12. The method of claim 11, wherein the step of accessing input vertex packets over a host bus comprises the steps of:

receiving virtual memory pointers over the host bus, the virtual memory pointers pointing to a geometry data array in a memory subsystem, the geometry data array containing the input vertex packets;

translating the virtual memory pointers into physical memory pointers;

reading the geometry data array over the host bus according to the physical memory pointers.

13. The method of claim 10, wherein the step of accessing input vertex packets over a host bus comprises the step of accessing the input vertex packets according to a programmed input/output communication protocol over the host bus.

14. The method of claim 10, wherein the step of transferring the output geometry packet over a floating-point bus comprises the steps of:

sensing a buffer status signal over the floating-point bus indicating whether an entry in an input buffer is available;

transferring the output geometry packet to the input buffer over the floating-point bus if the input buffer is available.

15. The method of claim 10, wherein the step of transferring the draw packet over a draw bus comprises the steps of:

sensing a control signal over the draw bus;

transferring the draw packet over a draw bus if the control signal is sensed.

16. The method of claim 10, wherein the subset of pixels comprises every fifth pixel per scan line corresponding to the three dimensional triangle.

17. The method of claim 16, wherein the frame buffer comprises a set of five interleaved video random access memory (VRAM) banks.

* * * * *